United States Patent
Gibbon et al.

(10) Patent No.: US 9,629,104 B2
(45) Date of Patent: *Apr. 18, 2017

(54) CLIENT-SIDE SCHEDULING FOR MEDIA TRANSMISSIONS ACCORDING TO CLIENT DEVICE STATES

(71) Applicant: AT&T Intellectual Property I, LP, Atlanta, GA (US)

(72) Inventors: David Crawford Gibbon, Lincroft, NJ (US); Andrea Basso, Turin (IT)

(73) Assignee: AT&T Intellectual Property I, LP, Atlanta, GA (US)

( * ) Notice: Subject to any disclaimer, the term of this patent is extended or adjusted under 35 U.S.C. 154(b) by 125 days.

This patent is subject to a terminal disclaimer.

(21) Appl. No.: 14/092,092

(22) Filed: Nov. 27, 2013

(65) Prior Publication Data

US 2015/0146697 A1    May 28, 2015

(51) Int. Cl.
*H04W 52/30*   (2009.01)
*H04W 52/02*   (2009.01)
*H04B 17/373*  (2015.01)
*H04B 17/382*  (2015.01)
*H04W 72/02*   (2009.01)
*H04W 28/02*   (2009.01)
(Continued)

(52) U.S. Cl.
CPC .......... *H04W 52/30* (2013.01); *H04B 17/373* (2015.01); *H04B 17/382* (2015.01); *H04W 52/0258* (2013.01); *H04W 72/02* (2013.01); *H04W 4/028* (2013.01); *H04W 28/0221* (2013.01); *H04W 40/10* (2013.01); *H04W 52/223* (2013.01)

(58) Field of Classification Search
CPC . H04W 4/028; H04W 28/0221; H04W 40/10; H04W 52/223; H04W 52/30; H04W 72/02; H04W 52/0258; H04B 17/373; H04B 17/382
See application file for complete search history.

(56) References Cited

U.S. PATENT DOCUMENTS 6,072,784 A * 6/2000 Agrawal ............... H04W 52/28
                                                          370/311
6,088,324 A * 7/2000 Sato .................... H04W 52/221
                                                          370/203
(Continued)

*Primary Examiner* — Parth Patel
*Assistant Examiner* — Kai Chang
(74) *Attorney, Agent, or Firm* — Andrew Gust; Guntin & Gust, PLC

(57) ABSTRACT

A mobile device that incorporates the subject disclosure may perform, for example, obtaining performance characteristics for network segments of a network where the network segments are selected from a group of network segments of the network based on a trajectory of the mobile device. The mobile device can monitor power state transitions of the mobile device, and can predict a future power state of the mobile device based on the monitoring of the power state transitions. The mobile device can determine a target time for sending a request for transmission of a data packet over the network where the target time is determined based on the performance characteristics for the network segments and based on the future power state of the mobile device. The mobile device can schedule a time for sending the request for transmission according to the target time. Other embodiments are disclosed.

20 Claims, 12 Drawing Sheets

(51) Int. Cl.
  *H04W 40/10* (2009.01)
  *H04W 52/22* (2009.01)
  *H04W 4/02* (2009.01)

(56) References Cited

U.S. PATENT DOCUMENTS

| | | | |
|---|---|---|---|
| 7,564,810 B2 | 7/2009 | Hernandez et al. | |
| 8,239,911 B1* | 8/2012 | Sun ........................... | 725/118 |
| 8,260,372 B2 | 9/2012 | Haumont | |
| 8,326,373 B2 | 12/2012 | Song et al. | |
| 8,467,821 B1* | 6/2013 | Noel, Jr. ............. | H04W 52/223 |
| | | | 455/456.1 |
| 8,514,812 B2 | 8/2013 | Tang et al. | |
| 8,751,845 B2* | 6/2014 | Assad et al. ................ | 713/340 |
| 9,271,238 B2* | 2/2016 | Ismail ............... | H04W 52/0258 |
| 9,363,772 B2* | 6/2016 | Burks ................ | H04W 52/383 |
| 2002/0115465 A1* | 8/2002 | Komatsu ............ | H04W 52/283 |
| | | | 455/522 |
| 2004/0203815 A1* | 10/2004 | Shoemake ............ | H04W 72/02 |
| | | | 455/450 |
| 2004/0224669 A1 | 11/2004 | Pedlar et al. | |
| 2004/0242182 A1* | 12/2004 | Hidaka ................... | H04B 1/44 |
| | | | 455/333 |
| 2005/0079886 A1* | 4/2005 | Niwano .................. | H04B 7/00 |
| | | | 455/522 |
| 2005/0239518 A1 | 10/2005 | D'Agostino et al. | |
| 2007/0111746 A1* | 5/2007 | Anderson ........... | H04W 52/223 |
| | | | 455/522 |
| 2008/0181155 A1* | 7/2008 | Sherman ........... | H04W 52/0229 |
| | | | 370/311 |
| 2010/0216524 A1* | 8/2010 | Thomas ............ | H04W 52/0264 |
| | | | 455/574 |
| 2010/0240410 A1 | 9/2010 | Peisa et al. | |
| 2012/0069196 A1* | 3/2012 | Carmel .................. | H04H 20/42 |
| | | | 348/193 |
| 2012/0163305 A1* | 6/2012 | Nimbalker ........ | H04W 52/0206 |
| | | | 370/329 |
| 2012/0184279 A1* | 7/2012 | Marti .................. | H04L 12/2838 |
| | | | 455/446 |
| 2012/0195242 A1* | 8/2012 | Pyles ................ | H04W 52/0251 |
| | | | 370/311 |
| 2013/0229964 A1 | 9/2013 | Chakravarthy et al. | |
| 2013/0232534 A1 | 9/2013 | Salkintzis et al. | |
| 2014/0070991 A1* | 3/2014 | Liu et al. ................. | 342/357.63 |
| 2014/0099967 A1* | 4/2014 | Egner ................... | H04W 4/028 |
| | | | 455/452.2 |
| 2014/0105046 A1* | 4/2014 | Tellado ................. | H04W 24/08 |
| | | | 370/252 |
| 2014/0132071 A1* | 5/2014 | Funakubo ............. | H02J 7/0068 |
| | | | 307/48 |
| 2014/0153456 A1* | 6/2014 | Park ...................... | H04W 52/38 |
| | | | 370/311 |
| 2014/0192663 A1* | 7/2014 | Rosa ................... | H04W 52/244 |
| | | | 370/252 |
| 2014/0269469 A1* | 9/2014 | Tran .................. | H04W 52/0251 |
| | | | 370/311 |
| 2014/0295842 A1* | 10/2014 | Choi et al. ..................... | 455/436 |
| 2015/0149592 A1* | 5/2015 | Gibbon et al. ................ | 709/219 |
| 2015/0319668 A1* | 11/2015 | Guo ...................... | H04W 36/32 |
| | | | 370/331 |

* cited by examiner

300

400

600

CLIENT-SIDE SCHEDULING FOR MEDIA TRANSMISSIONS ACCORDING TO CLIENT DEVICE STATES

FIELD OF THE DISCLOSURE

The subject disclosure relates to media distribution and content delivery management over networks, and more specifically to a method and device for scheduling data transmissions.

BACKGROUND

A mobile device, moving into and out of multiple network segments or regions, may encounter differing network capabilities. Data transmission rates to and from the mobile device typically depend upon the available bandwidth at the time the device is at a given location.

BRIEF DESCRIPTION OF THE DRAWINGS

Reference will now be made to the accompanying drawings, which are not necessarily drawn to scale, and wherein.

DETAILED DESCRIPTION

Figure 1:
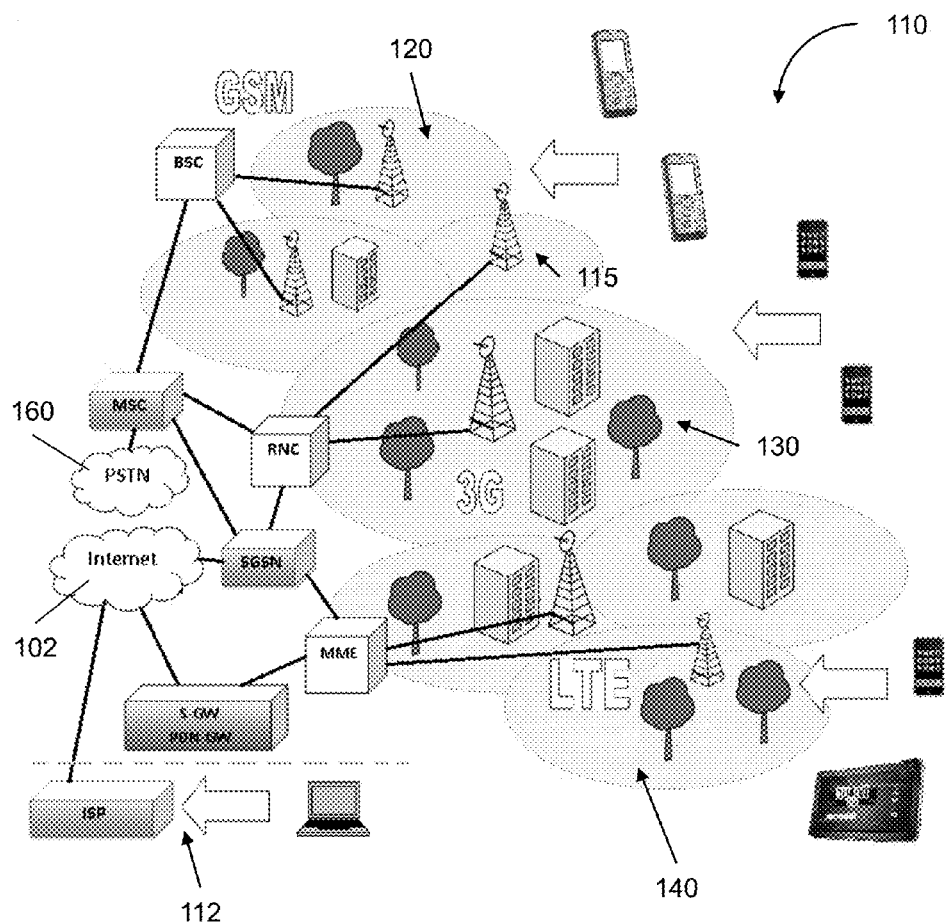
FIG. 1 depicts an illustrative embodiment of an architecture for a cellular network for interacting with mobile devices.

The subject disclosure describes, among other things, illustrative embodiments of devices and methods for providing data over a network to a client device (e.g., a mobile device). In one or more embodiments, transmission requests can be managed (e.g., scheduling and/or rescheduling the requests) according to various factors, such as one or more of predicted power states of a mobile device, network performance characteristics, historical network data, and so forth. In one or more embodiments, the performance characteristics can be used for predicting future characteristics of a network. In one embodiment, some or all of the future characteristics can be predicted for network segments of a network where the network segments are portions of the network along, or otherwise associated with, a trajectory of the mobile device. The future characteristics can include future transport characteristics (e.g., predicted network traffic, predicted jitter, predicted available bandwidth, and so forth) and/or future segment characteristics (e.g., future availability of network elements of the network segments).

In one or more embodiments, the predicted future power state of a mobile device can be based on monitoring of power state transitions of the mobile device. In one or more embodiments, the predicted future power state of the mobile device can be based on determining an elapsed time from sending a particular request for transmission. In one or more embodiments, the predicted future power state of a mobile device can be based on determining an elapsed time from receiving a particular data packet. In one or more embodiments, the particular request for transmission and/or the receiving of the particular data packet can be associated with an application being executed by the mobile device which is different from another application for which a request for transmission is being scheduled based on the predicted future power state of a mobile device.

Other embodiments are included in the subject disclosure.

The exemplary embodiments described herein are related to, and can be combined with or replaced by, methods and/or components described in U.S. application Ser. No. 14/092,073, entitled "SERVER-SIDE SCHEDULING FOR MEDIA TRANSMISSIONS ACCORDING TO CLIENT DEVICE STATES" issued as U.S. Pat. No. 9,197,717, the disclosure of which is hereby incorporated by reference.

One embodiment of the subject disclosure includes a mobile device having a memory to store instructions and a controller coupled to the memory. The controller, responsive to executing the instructions, can perform operations including obtaining performance characteristics for network segments of a network, where the mobile device is communicatively coupled to the network. The network segments can be selected from a group of network segments of the network based on a trajectory of the mobile device. The controller can predict a future transport characteristic and a future segment characteristic for the network segments based on the performance characteristics. The future segment characteristic may not be associated with one or more non-selected network segments of the group of network segments. The controller can predict a future power state of the mobile device based on monitoring a power state of the mobile device. The controller can determine a target time for sending a request for transmission of a data packet over the network. The target time can be determined based on the future power state of the mobile device, the future transport characteristic, and the future segment characteristic. The controller can schedule a time for sending the request for transmission according to the target time.

One embodiment of the subject disclosure is a method including obtaining, by a mobile device comprising a processor, performance characteristics for network segments of a network, where the mobile device can be communicatively coupled to the network. The network segments can be selected from a group of network segments of the network based on a trajectory of the mobile device. The method can include monitoring, by the mobile device, power state transitions of the mobile device. The method can include predicting, by the mobile device, a future power state of the mobile device based on the monitoring of the power state transitions. The predicting of the future power state can be based on determining a first elapsed time from sending a first request for transmission or a second elapsed time from receiving a first data packet. The method can include determining, by the mobile device, a target time for sending a second request for transmission of a second data packet over the network. The target time can be determined based on the performance characteristics for the network segments and based on the future power state of the mobile device. The method can include scheduling, by the mobile device, a time for sending the second request for transmission according to the target time.

One embodiment of the subject disclosure includes a computer-readable storage device comprising executable instructions which, responsive to being executed by a processor of a mobile device, cause the processor to perform operations including obtaining performance characteristics for network segments of a network. The network segments can be selected from a group of network segments of the network based on a trajectory of the mobile device. The operations can include monitoring power state transitions of the mobile device and predicting a future power state of the mobile device based on the monitoring of the power state transitions. The operations can include determining a target time for sending a request for transmission of a data packet over the network, where the target time is determined based on the performance characteristics for the network segments and based on the future power state of the mobile device. The operations can include scheduling a time for sending the request for transmission according to the target time.

FIG. 1 schematically illustrates an architecture 100 for a cellular network. Mobile devices 110 can be various types of devices such as smartphones, tablets, laptops, vehicle communication systems, and so forth. The mobile devices 110 can establish or otherwise initiate communications with other end user devices, such as utilizing a Public Switched Telephone Network (PSTN) 160 (e.g. for voice traffic) or an internet protocol network (Internet) 102 (e.g., for data traffic). As shown schematically in FIG. 1, a given mobile device 110 can move through geographic regions having different and sometimes overlapping networks with different characteristics. As an example, a mobile device 110 can access a Global System for Mobile Communications (GSM) network 120 by connecting with a base station 115 belonging to or associated with network 120. As shown in FIG. 1, the architecture 100 can include various types of networks such as GSM network 120, a third generation (3G) network 130, and/or a Long Term Evolution (LTE) network 140. For instance, the LTE network 140 can provide an internet protocol architecture with a voice over internet protocol (VoIP) for providing voice communication services to the mobile devices 110. FIG. 1 also illustrates providing access to one or more of the networks through an Internet Service Provider (ISP) broadband connection 112.

In general, a mobile device 110 that is in motion can connect with a variety of networks, or network segments of a network, and therefore receive and transmit data at different rates at different times. A network segment, as described in the exemplary embodiments, can be a portion of a network which is defined or otherwise designated based on various criteria, such as a network segment falling between particular network nodes or network elements, a network segment having a particular geographic area and/or shape, a network segment with a service region based on a particular set of network devices, and so forth. The number and configuration of the network segments making up a particular network can vary. Additionally, network segments can vary over time, such as two network segments merging into a single network segment in response to particular network devices in the network segments going offline. In the architecture 100, a network (e.g., LTE network 140) can be intermittently available at a given location. According to an embodiment of the disclosure, a mobile device 110 can communicate with a server via one of the networks using a Dynamic Adaptive Streaming over HTTP (DASH) protocol, including sending requests for data (e.g., media content) and receiving data packets (e.g., media segments for presentation on the mobile device).

Figure 2:
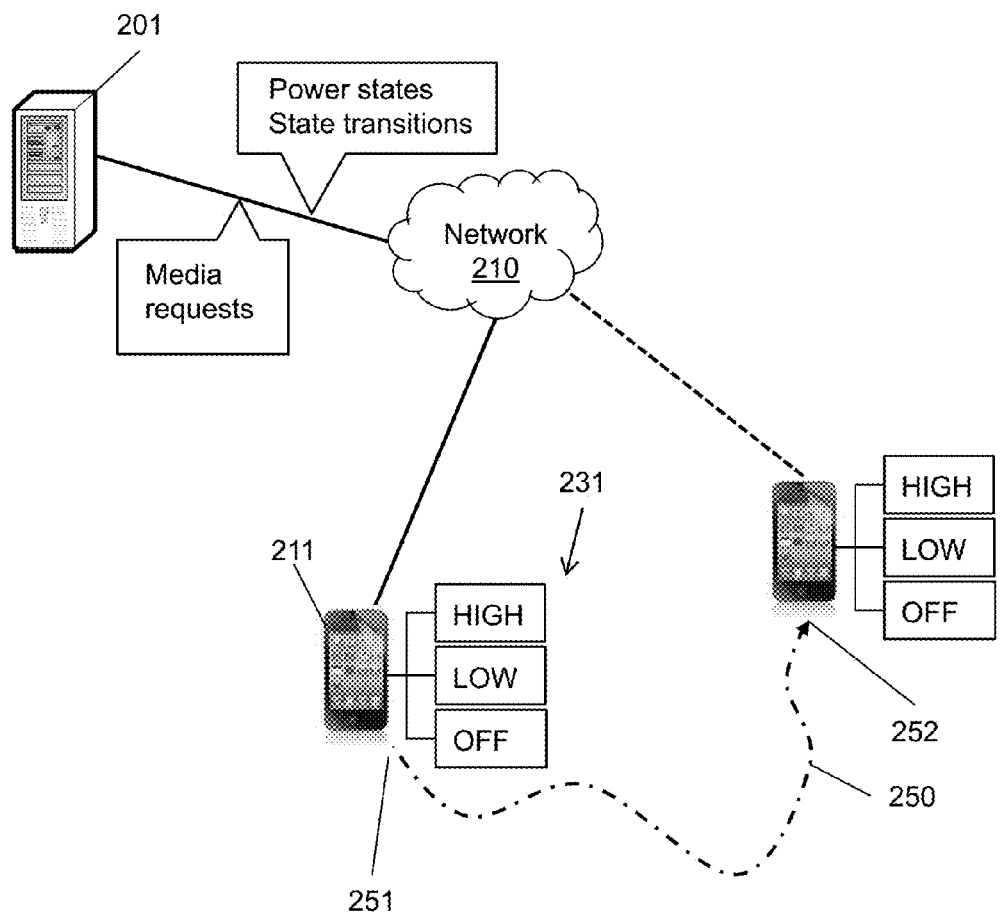
FIG. 2 depicts an illustrative embodiment of a network monitored by a server and a mobile device communicating with the network, where the mobile device transitions between power states.

As shown schematically in system 200 of FIG. 2, a DASH-compliant server 201 can communicate with a mobile device 211 over a network 210. The server 201 can monitor an individual network connection between the network 210 and the mobile device 211 while the mobile device 211 moves from one location to another (e.g., along path 250 from a starting point 251 to an ending point 252). In one or more embodiments, the path 250 can be associated with a trajectory of the mobile device 211. The trajectory of the mobile device 211 can be an actual trajectory (e.g., a mobile device of a passenger in a train can have an actual trajectory which will be along the path of the train which is known ahead of time) or a predicted trajectory (e.g., based on device location, device speed, device acceleration and/or how long the mobile device has been moving along the path). In one or more embodiments, a trajectory can be determined based on other information. For instance, historical location information can be used for determining a trajectory. As an example, historical location can indicate that a mobile device traveling through starting point 251 has in the past moved to ending point 252 along path 250. In one embodiment, the server 201 can receive requests for media segments (e.g., segments of media content such as packets of video data) from the mobile device 211.

In this embodiment, the mobile device 211 can have a number of different power states, such as three power states 231: off, low-power and high-power. The mobile device 211 can apply or otherwise follow a power control procedure in which state transitions are controlled based on various factors including the current power state, requests for media segments transmitted to the server 201, and/or an elapsed time period (e.g., since the last change of power state, since the end of sending a request, and/or since the end of receiving a data packet). The power control procedure may also take into account the network transmission requests from other applications running on the device. For example, if another application such as an e-mail application is sending data from the device, the power control procedure may remain in the high-power state for a longer period of time. In one or more embodiments, the elapsed time periods that are utilized in the power control procedure can be based on transmission requests or data packets received that are associated with another application being executed by the mobile device.

In one embodiment, an algorithm for media segment request control can be linked to a mobile device power state control mechanism. For example, based on awareness of network performance and/or awareness of the power states, the mobile device 211 can alter its schedule for transmitting requests for media segments.

Figure 3:
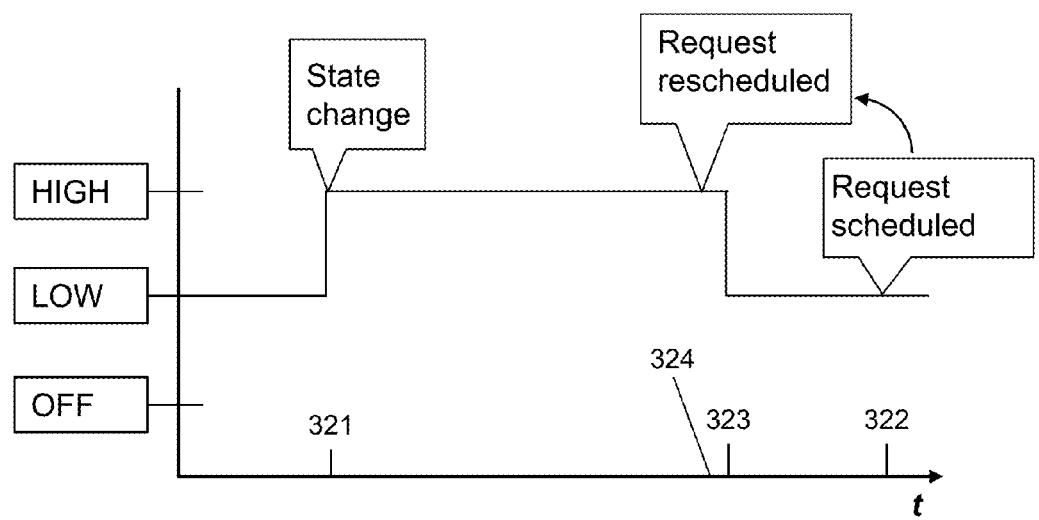
FIG. 3 schematically illustrates rescheduling a request to a server from a mobile device due to an anticipated power state transition at the mobile device.

FIG. 3 illustrates a time sequence 300 in which the mobile device 211 executes state transitions and in which the schedule for sending media requests to the server 201 can be altered by a packet request scheduler of the mobile device, such as in response to an anticipated change of state. In this embodiment, the power state can be changed in two ways: by requesting transmission of a data packet, the power state machine will remain in an active (high-power) state; by modifying control logic of the mobile device based on the status of the media buffer.

In the example of FIG. 3, the mobile device 211 can move from the low-power state to the high-power state at time 321. The mobile device 211 can determine that a lack of new requests for data transport will result in a state change back to the low-power state at time 323 after an elapsed time (e.g., 3 seconds after the last change of state at time 321). The mobile device 211 can then reschedule the request for a media segment (or other data) from time 322 to time 324 (which is prior to time 323), so that the mobile device 211 can receive the transmission while avoiding the delay and power consumption incurred in changing states.

In another embodiment, the mobile device 211 can be stationary, and the network characteristics can be constant during the duration of the reception of data. In this embodiment, the scheduling of requests for data packets may only be coordinated with the power state of the mobile device 211 based on a prediction of the future power state which may be inferred from prior observation of the changes of power state, and/or may be determined with knowledge of the power control procedure and related information such as current parameter settings or user preferences (e.g., if the device is in a near full battery state vs. a low battery state). In another embodiment, a packet request scheduler of the mobile device 211 communicates with the power control procedure so that, for example, the packet request scheduler may inform the power control procedure that a new packet will be requested in 300 milliseconds so that the power control procedure should not move from a high-power state to a lower power state until the imminent data transfer request has transpired. In one embodiment, the packet request scheduler and the power control procedure can be applications that are executed or otherwise implemented by the same components of the mobile device 211 (e.g., a processor) or by different components, such as a packet request controller and a power controller.

Figure 4:
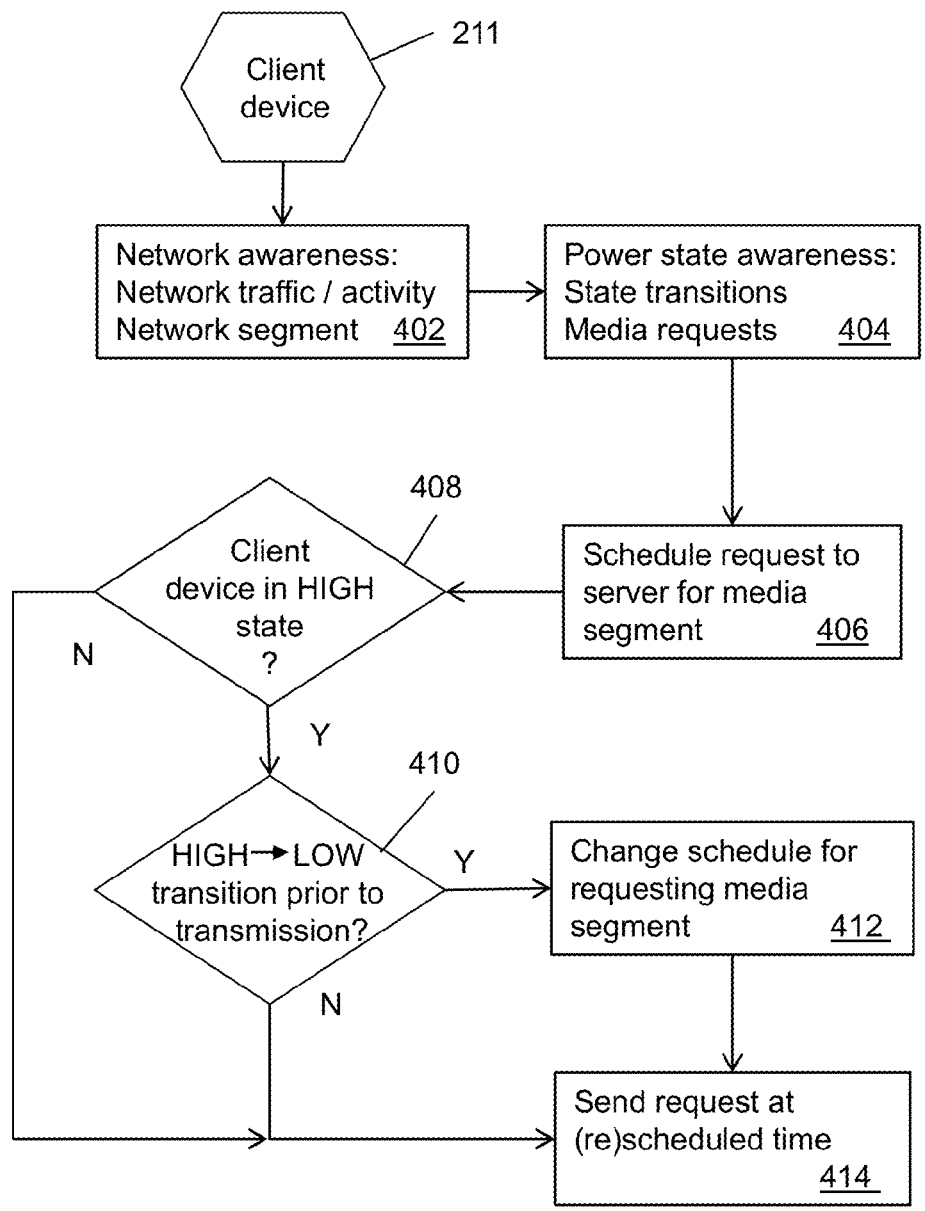
FIG. 4 is a flowchart illustrating a method for client-side scheduling of requests for transmission of media segments from a server based on power state transitions of the mobile device, in accordance with an embodiment.

FIG. 4 is a flowchart illustrating a method 400 for client-side scheduling of requests for data (e.g., media segments) based on power state transitions of a mobile device, in accordance with an embodiment of the disclosure. In step 402, the mobile device (e.g. mobile device 211 shown in FIG. 2) monitors network activity (e.g. network traffic, network delays, jitter, throughput, round trip transit time, number of client transmission requests such as for clients at other devices, network execution time for client transmission requests such as for clients at the other devices, and so forth). In this embodiment, the mobile device can be communicatively coupled to a DASH-compliant server via the network, such as to receive various performance characteristics (e.g., current and/or historical data) associated with the network and/or associated with particular portions of the network (e.g., network segments selected based on the trajectory of the mobile device). For example, the mobile device can obtain segment characteristics of the network (segments of the network may have differing characteristics) to account for network characteristics changing with the network segment as the device changes location. The mobile device can monitor the current power state, the time since the last power state transition, the requests for data transport, and/or data being received (step 404).

In step 406, the mobile device can schedule a request for data (e.g., a media segment). The mobile device determines whether the mobile device is in the high-power state (step 408). If the mobile device is in the low-power state, the mobile device will transmit the request to the server at the scheduled time (step 414). If the mobile device is in the high-power state, the mobile device determines (step 410) whether an anticipated transition to the low-power state will occur before the scheduled request. If so, the mobile device reschedules the request (step 412) and transmits the request at the rescheduled time (step 414). In this example, the rescheduling of the request to a time that is prior to the anticipated transition of the mobile device to the low-power state (i.e., the mobile device is still in a high-power state) can alleviate the mobile device from performing another power transition back to a high-power state that may be required to enable the transmitting of the transmission request and/or receiving of the data packet in response to the transmitting of the request.

With reference to method 400, the mobile device 211 can be a state machine performing scheduling of requests to a server for data transport. Although the embodiments describe the states of the mobile device as power states, the exemplary procedures may be implemented by monitoring other types of states associated with the mobile device. For example, certain levels of network traffic may be defined as states (high-traffic, low-traffic, etc.) for the mobile device 211. In an embodiment, the mobile device 211 can use historical network performance to predict astute transition from high-traffic to low-traffic, and can reschedule a request to be performed in the anticipated low-traffic state. In one or more embodiments, by developing models of network activity and implementing those models in a client-side state machine based scheduler, transmission request efficiencies for the mobile device can be improved such as by reducing the number of power state transitions at the device, utilizing network elements in particular network segments that have higher network performance, and so forth.

Figure 5:
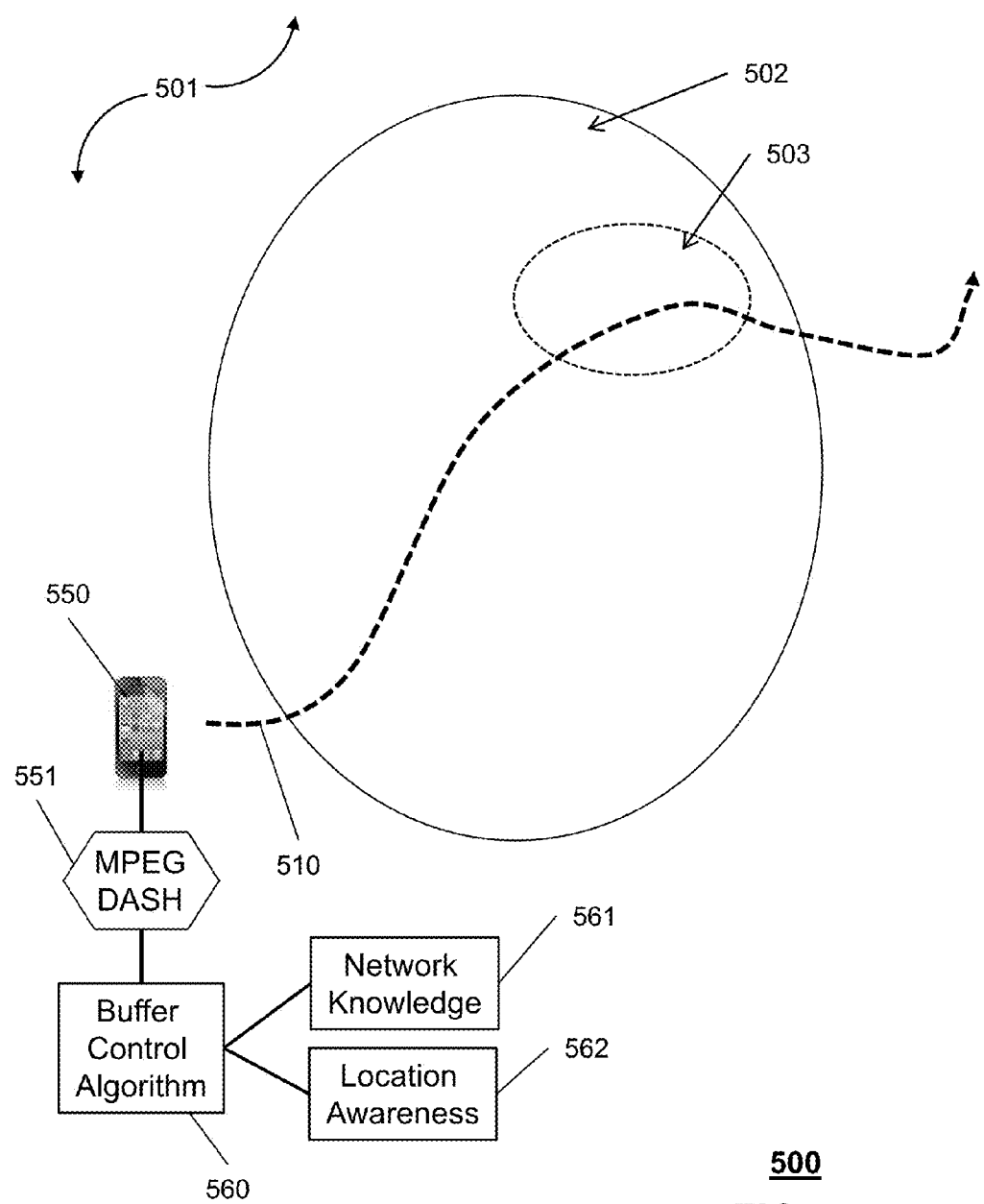
FIG. 5 depicts an illustrative embodiment of a mobile device moving through areas of a network having different network capabilities.

FIG. 5 depicts an illustrative embodiment 500 in which a personal media device 550 moving in and out of multiple network regions may encounter differing network capabilities. A region can correspond to an area of coverage of a distinct network, or an area of coverage of a segment of a larger network. Knowledge of a network region into which a personal media device may be moving allows for improvement of data transmission through the new region. In an embodiment, the efficiency for transmission of data packets (e.g., video, audio, etc. referred to herein generally as media segments although other data can also be transmitted) can be improved by leveraging network knowledge (e.g., knowledge of real-time conditions in the network region and/or knowledge of historical data associated with network performance such as based on a particular time of day which can include a particular day of the year) at the various locations that the personal media device 550 enters and traverses (e.g. as personal media device 550 travels along path 510).

In the example shown in FIG. 5, the personal media device 550 generally moves in region 501, but moves into and out of area 502 where lower bandwidth is available, and traverses area 503 where higher bandwidth networking is available. As an example, area 503 (e.g. a network segment) may correspond to a WiFi hotspot coverage area or a location of LTE coverage.

In this embodiment, the personal media device 550 includes a processor on which an MPEG DASH client 551 can be executed. The MPEG DASH client running on the personal media device 550 can take advantage of intermittent availability of higher bandwidth networks by means of a local buffer control algorithm 560 that requests additional low bitrate media segments, high bitrate media segments, or a combination of the two to augment or replace the usual buffering scheme. The buffer control algorithm can use network performance data 561 for various locations (including for example an anticipated location of a hotspot in area 503), and geographic information 562 pertaining to the location of the device. In this embodiment, both the device location and the network performance can be dynamic; that is, the personal media device 550 can be in motion along path 510 while the higher bandwidth in area 503 (e.g., a WiFi hotspot coverage area) is available only intermittently.

Figure 6:
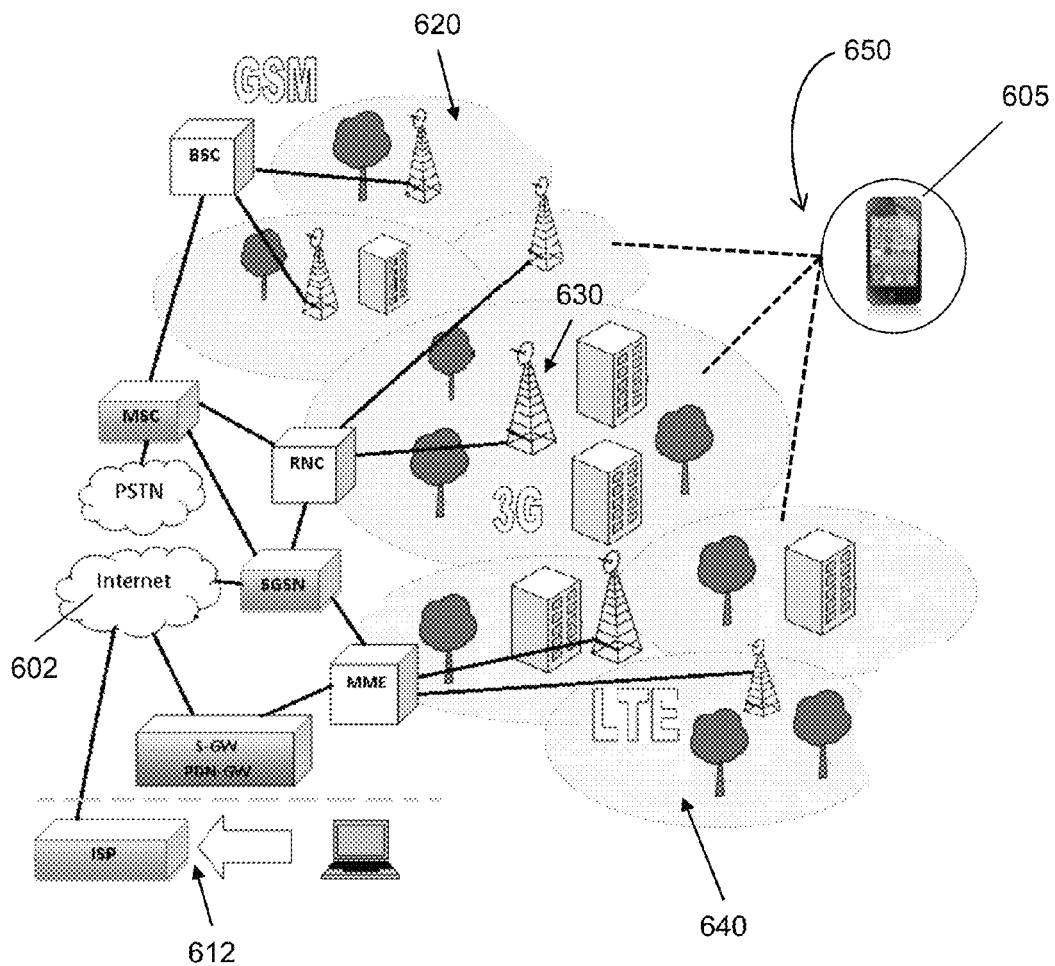
FIG. 6 depicts an illustrative embodiment in which communication networks interact with a mobile device.

In an embodiment, the client executing on the personal media device 550 can also evaluate network conditions for a plurality of available networks to determine a desired network connection at a particular time. For example, as shown in FIG. 6, a mobile device 605 at a location 650 is able to connect with a GSM network 620, a 3G network 630, or an LTE network 640. In this embodiment, the mobile device 605 can process data regarding network traffic and network delays affecting the available bandwidth, and can then dynamically select the network providing the highest bandwidth available at that location. This selection can also be based on predicted characteristics of the GSM network 620, the 3G network 630, and/or the LTE network 640. For instance, at a present time the GSM network 620 may have the highest bandwidth but a prediction can be made by the mobile device 605 that the bandwidth for the GSM network 620 will be lower in the very near future (e.g., based on historical data associated with the GSM network 620, a monitoring of the number of transmission requests by other devices that are still pending for the GSM network, and so forth). Based on this prediction, the mobile device 605 may establish a connection with another of the networks rather than GSM network 620

It will be appreciated that transport characteristics of the network (traffic, delays, hotspots, etc.) may change over time, even for a device that does not change its location. For example, the personal media device 550 can remain in area 503 while the high-bandwidth network in that region is available only intermittently. In an embodiment, the network transport characteristics can include historical data such as regarding bandwidth available at a given location, so that availability of an intermittent high-bandwidth network (e.g., a hotspot) can be predicted.

Figure 7:
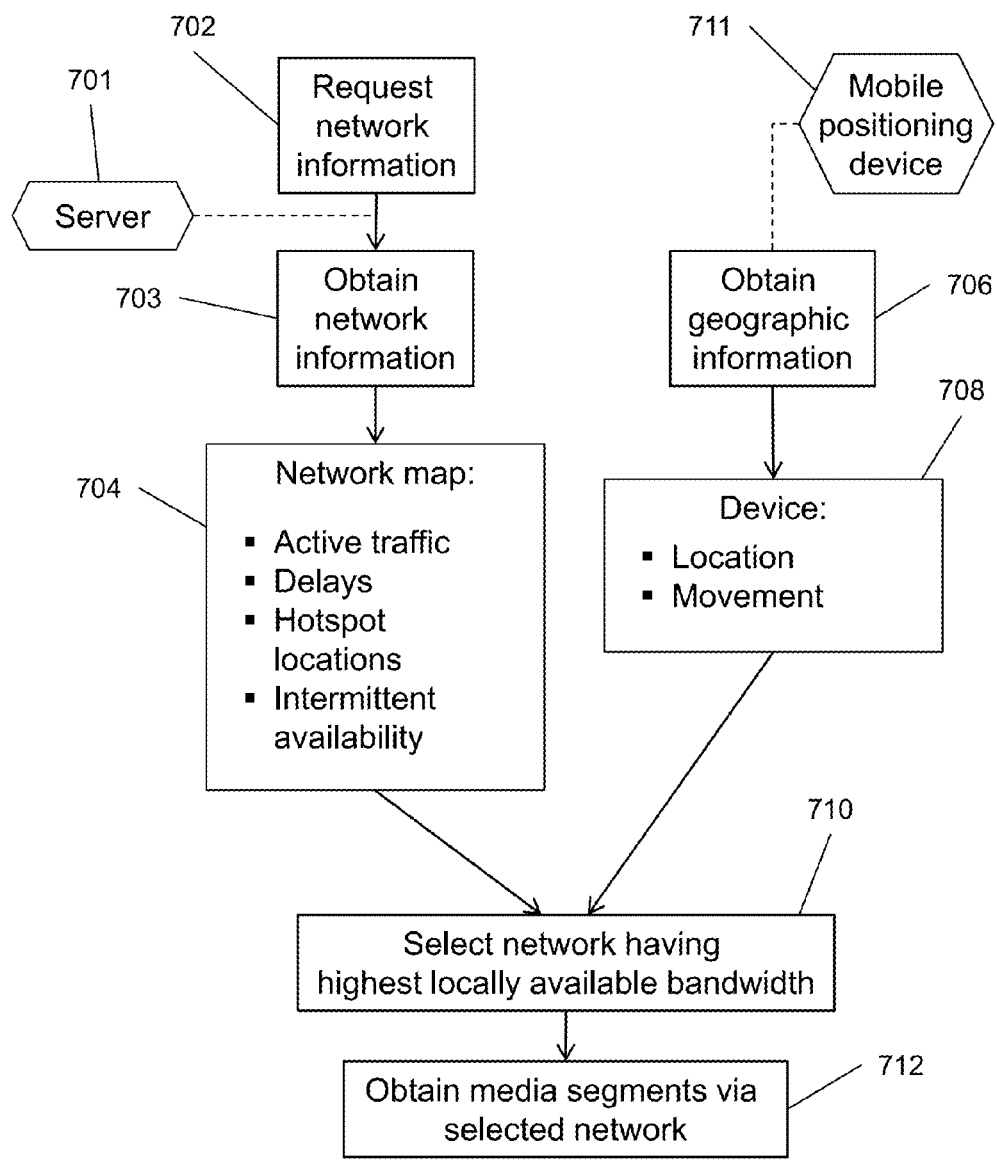
FIG. 7 schematically illustrates a method for providing media segments to a mobile device at a high locally available bandwidth, in accordance with an embodiment.

FIG. 7 illustrates a method 700 in which network information in combination with location awareness (knowledge of network characteristics at a geographic location the mobile device is passing through and/or will pass through such as network segments) is used to select the most advantageous network for the mobile device to connect with. In an embodiment, the mobile device requests network information comprising transport characteristics of the network (step 702), such as based on device position and/or device trajectory. The mobile device can also obtain the network information from a server 701 communicating with the mobile device (step 703). The network information can be provided by a server using a network map (step 704) with information on active traffic conditions, network delays, hotspot locations, availability of intermittent connections, device or resource availability (e.g., based on scheduled maintenance), and so forth.

The mobile device is equipped with a positioning device 702 so that the mobile device obtains geographic information (step 706). In this embodiment, the mobile device has both positioning and motion sensing, so that the device's current location is known and movement to a new location can be predicted (step 708). The mobile device can apply the device location and movement information (current and predicted locations) to select the network with the highest locally available bandwidth (step 710). The mobile device uses the network map information to transition from one network to another to take advantage of the highest available bandwidth (for example, moving from the network covering area 502 to the network providing area 503 with hotspot coverage). The mobile device then obtains media segments (step 712) via the network having the best performance at that time and at that location In another embodiment, the mobile device transmits its location and movement data to server 701, which then determines the best-performing network and automatically provides requested media segments using that network.

Figure 8:
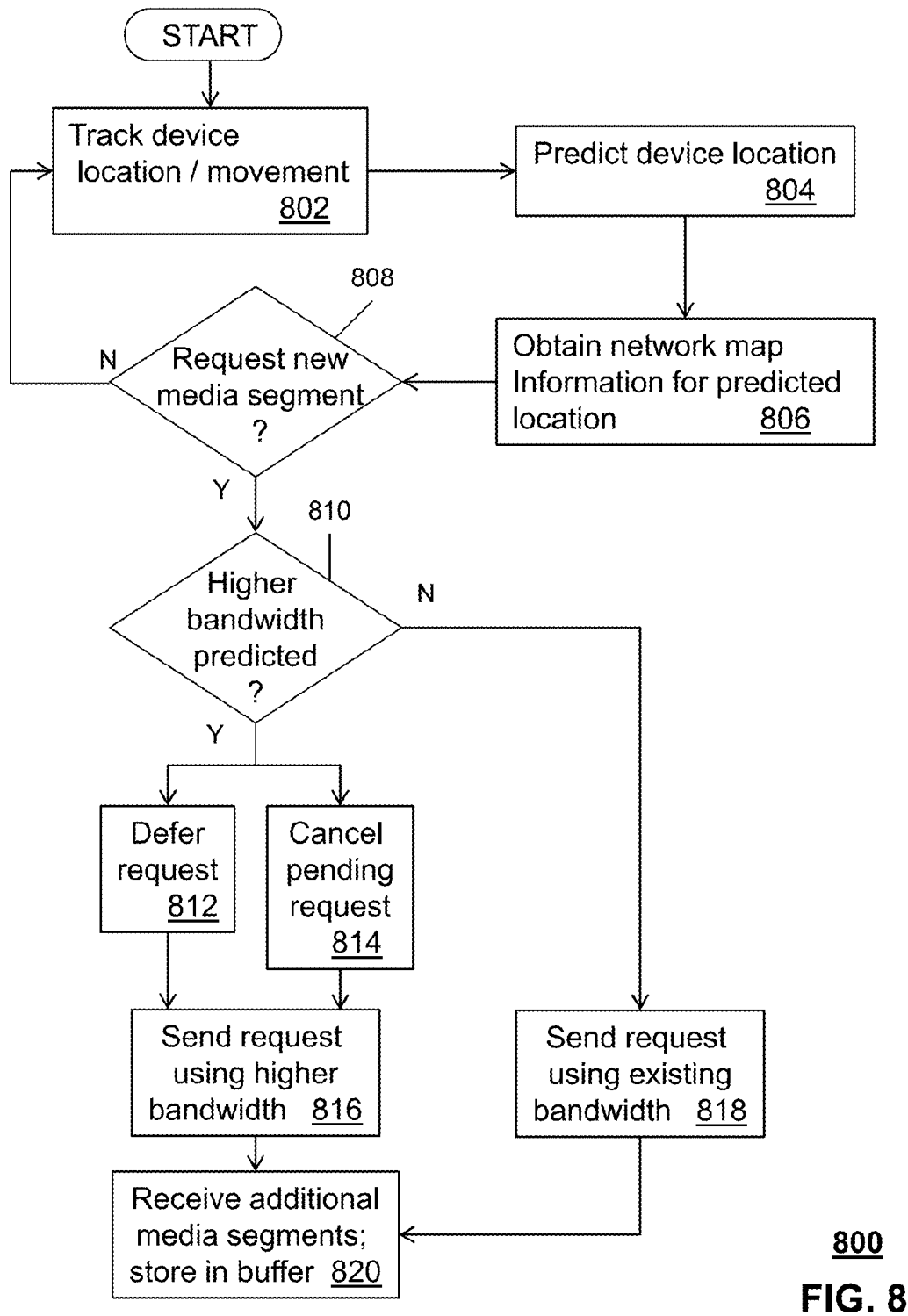
FIG. 8 is a flowchart illustrating a method for requesting a media segment at a mobile device, according to an embodiment.

FIG. 8 is a flowchart showing a method 800 for requesting a media segment by a mobile device, in accordance with an embodiment. The mobile device's location and movement are tracked (step 802) to predict the device's location (step 804) over a certain time interval (e.g., location in the next 10 seconds). Network information is provided by a server using a network map with information on active traffic conditions, delays, etc. for the predicted location (step 806).

A request for a new media segment can be scheduled using network knowledge, such as the network information regarding the predicted location of the mobile device. The scheduling can also be done in conjunction with a predicted power state of the mobile device, such as described with respect to method 400. When the mobile device is to make a request for a new media segment (step 808), it is determined (step 810) whether the mobile device is likely to enter a region of higher bandwidth coverage (e.g. area 503 with WiFi hotspot coverage) within the time period for predicting movement (e.g. within 5 seconds when location prediction is for 10 seconds). If not, the request is sent using the presently available bandwidth (step 818).

If higher bandwidth is predicted, the request for the new media segment can be deferred (step 812) and issued when that coverage becomes available (step 814). For example, if the mobile device buffer is running low such that it will be necessary to request a new media segment within a 5 to 10 second time interval, and it is determined that the mobile device is likely to enter a region of WiFi coverage within 5 seconds, the request can be deferred and issued when the WiFi network becomes available. In addition, pending requests for media segments can be canceled in anticipation of higher bandwidth (step 814) and then re-issued (step 816) to take advantage of the locally greater bandwidth. In an embodiment, the mobile device can take advantage of the higher bandwidth by requesting additional media segments. Media segments received by the mobile device, but not required for presentation, can be stored in a buffer (step 820).

In an embodiment, media requests are scheduled to be sent at a predicted time of higher bandwidth availability. Scheduling can be both dynamic and improved on a per client basis.

Figure 9:
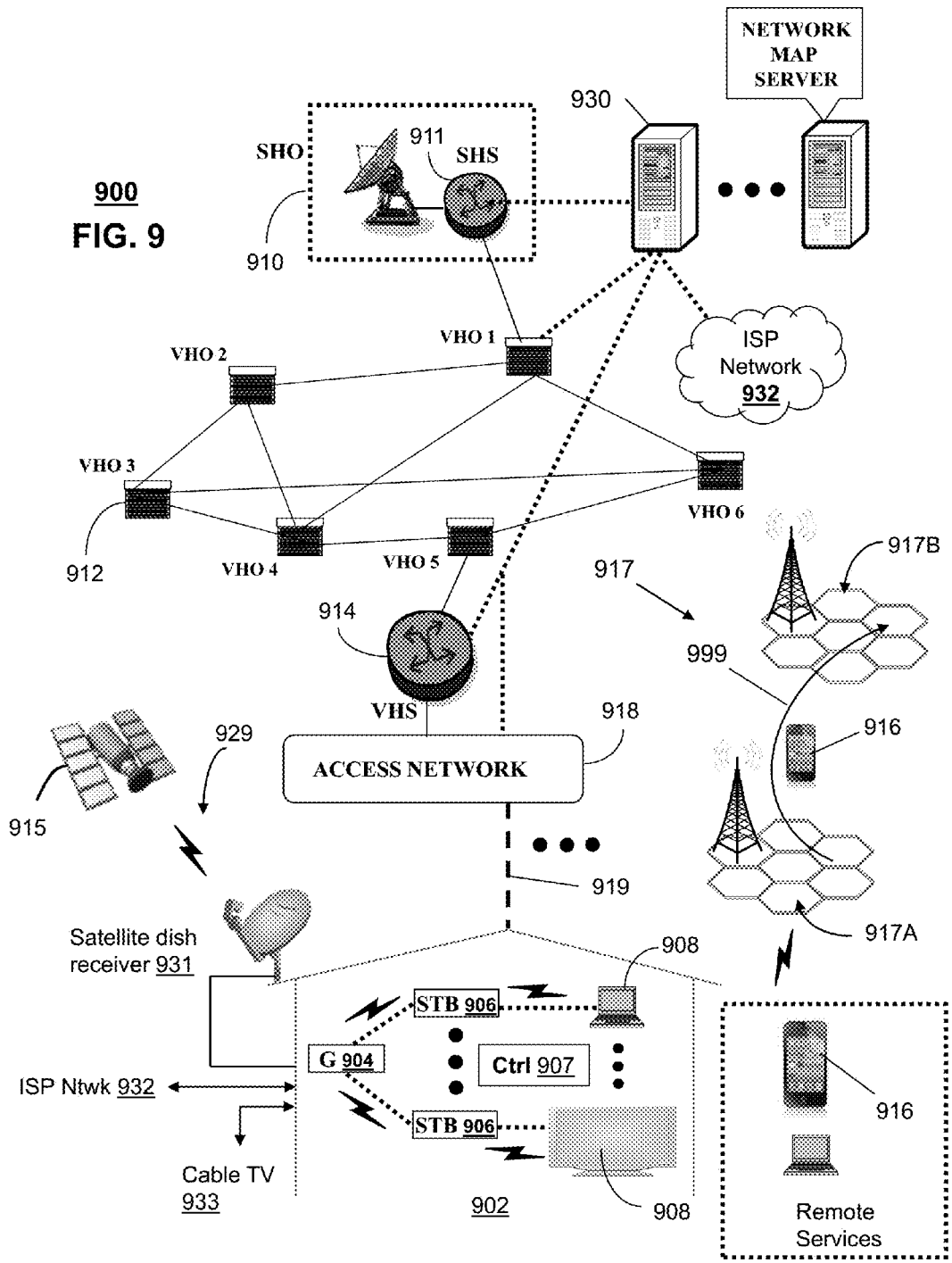
FIG. 9 depicts an illustrative embodiment of a communication system including a wireless communication network.

FIG. 9 depicts an illustrative embodiment of a first communication system 900 for delivering media content.

The communication system 900 can represent an Internet Protocol Television (IPTV) media system. Communication system 900 can be overlaid or operably coupled with a system supporting a mobile device and providing media segments at a desired locally available bandwidth as another representative embodiment of communication system 900.

As shown in FIG. 9, a mobile device 916, communicating with a network 917, can obtain performance characteristics for network segments 917A and/or 917B of the network. These network segments 917A and/or 917B can be selected from a group of network segments of the network 917, such as based on a trajectory 999 of the mobile device 916. The trajectory can be determined, such as by the mobile device 916, from various factors including one or more of speed, acceleration, duration of movement, context of travel (e.g., in a vehicle along a highway), historical movement (e.g., historical paths that have been stored by the mobile device 916 and represent commuting), and so forth. The mobile device 916 can predict a future transport characteristic (e.g., predicted network traffic delay, predicted available bandwidth, predicted jitter, predicted throughput, predicted number of pending transmission requests, and so forth) and/or a future segment characteristic (e.g., future availability of network elements, future scheduled transmission requests from each network element, and so forth) for the network segments based on the performance characteristics. In one embodiment, the future segment characteristic may not be associated with a non-selected network segment of the group of network segments (e.g., the future segment characteristic can be representative of conditions in one or more of the selected network segments but is not representative of conditions in one or more of non-selected network segments).

The mobile device 916 can predict its future power state based on monitoring of the power states of the mobile device, such as detecting power transitions of the mobile device, monitoring elapsed time from a previous transmission request or a previous receipt of a data packet, and so forth. The mobile device 916 can determine a target time for sending a request for transmission of a data packet over the network. The target time can be determined based on one or more of the future power state of the mobile device, the future transport characteristic, and the future segment characteristic. The target time can be used for scheduling a time for sending the request for transmission of the data packet, such as to a server that will provide the data packet.

In one or more embodiments, the target time can be determined based on reducing a degradation in a viewing quality of media content to be displayed by the mobile device, where the trajectory of the mobile device is on a path having network elements that provide varying transmission rates to the mobile device. The degradation reduction can be determined or otherwise identified based on various factors, such as a prediction that resolution may need to be reduced due to a prediction of an increase in transmission errors or a decrease in available bandwidth.

The IPTV media system can include a super head-end office (SHO) 910 with at least one super headend office server (SHS) 911 which receives media content from satellite and/or terrestrial communication systems. Media content can represent, for example, audio content, moving image content such as 2D or 3D videos, video games, virtual reality content, still image content, and combinations thereof. The SHS server 911 can forward packets associated with the media content to one or more video head-end servers (VHS) 914 via a network of video head-end offices (VHO) 912 according to a multicast communication protocol. One or more of these network elements can be utilized in delivering media segments to the mobile device 916, such as through the mobile device selecting a desired network (e.g., network 917) to establish a communication session for delivery of the data packet(s).

The VHS 914 can distribute multimedia broadcast content via an access network 918 to commercial and/or residential buildings 902 housing a gateway 904 (such as a residential or commercial gateway). The access network 918 can represent a group of digital subscriber line access multiplexers (DSLAMs) located in a central office or a service area interface that provide broadband services over fiber optical links or copper twisted pairs 919 to buildings 902. The gateway 904 can use communication technology to distribute broadcast signals to media processors 906 such as Set-Top Boxes (STBs) which in turn present broadcast channels to media devices 908 such as computers or television sets managed in some instances by a media controller 907 (such as an infrared or RF remote controller).

The gateway 904, the media processors 906, and media devices 908 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies (Bluetooth® and ZigBee® are trademarks registered by the Bluetooth Special Interest Group and the ZigBee Alliance, respectively). By way of these interfaces, unicast communications can also be invoked between the media processors 906 and subsystems of the IPTV media system for services such as video-on-demand (VoD), browsing an electronic programming guide (EPG), or other infrastructure services. In one or more embodiments, the gateway 904, the media processors 906, and/or the media devices 908 can be used in delivering media segments to the mobile device 916, such as through the mobile device selecting a desired network (e.g., network 917) to establish a communication session for delivery of data packet(s) from the gateway 904, the media processors 906, and/or the media devices 908.

A satellite broadcast television system 929 can be used in the media system of FIG. 9. The satellite broadcast television system can be overlaid, operably coupled with, or replace the IPTV system as another representative embodiment of communication system 900. In this embodiment, signals transmitted by a satellite 915 that include media content can be received by a satellite dish receiver 931 coupled to the building 902. Modulated signals received by the satellite dish receiver 931 can be transferred to the media processors 906 for demodulating, decoding, encoding, and/or distributing broadcast channels to the media devices 908. The media processors 906 can be equipped with a broadband port to an Internet Service Provider (ISP) network 932 to enable interactive services such as VoD and EPG as described above.

In yet another embodiment, an analog or digital cable broadcast distribution system such as a cable TV system 933 can be overlaid, operably coupled with, or replace the IPTV system and/or the satellite TV system as another representative embodiment of the communication system 900. In this embodiment, the cable TV system 933 can provide Internet, telephony, and interactive media services.

The subject disclosure can apply to other present or next generation over-the-air and/or landline media content services system.

Some of the network elements of the IPTV media system can be coupled to one or more computing devices 930, a portion of which can operate as a web server for providing web portal services over the ISP network 932 to wireline media devices 908 or mobile devices 916.

Communication system 900 can also provide for all or a portion of the computing devices 930 to function as a network map server providing network information as discussed above. The network map server 930 can use computing and communication technology to provide information on network performance, which can include among other things, information on network traffic and intermittent network availability. The media processors 906 and the mobile devices 916 can be provisioned with software functions to utilize the services of the network map server. For example, the network map server can provide performance characteristics of network segments 917A and/or 917B so that a mobile device 916 can schedule a time for requesting transmission of a data packet (e.g., a media segment) from the IPTV network (e.g., via access network 918).

Multiple forms of media services can be offered to media devices over landline technologies such as those described above. Additionally, media services can be offered to media devices by way of a wireless access base station 917 operating according to common wireless access protocols such as GSM, Code Division Multiple Access (CDMA), Time Division Multiple Access (TDMA), Universal Mobile Telecommunications (UMTS), World interoperability for Microwave (WiMAX), Software Defined Radio (SDR), LTE, and so on. Other present and next generation wide area wireless access network technologies can be used in one or more embodiments of the subject disclosure.

Figure 10:
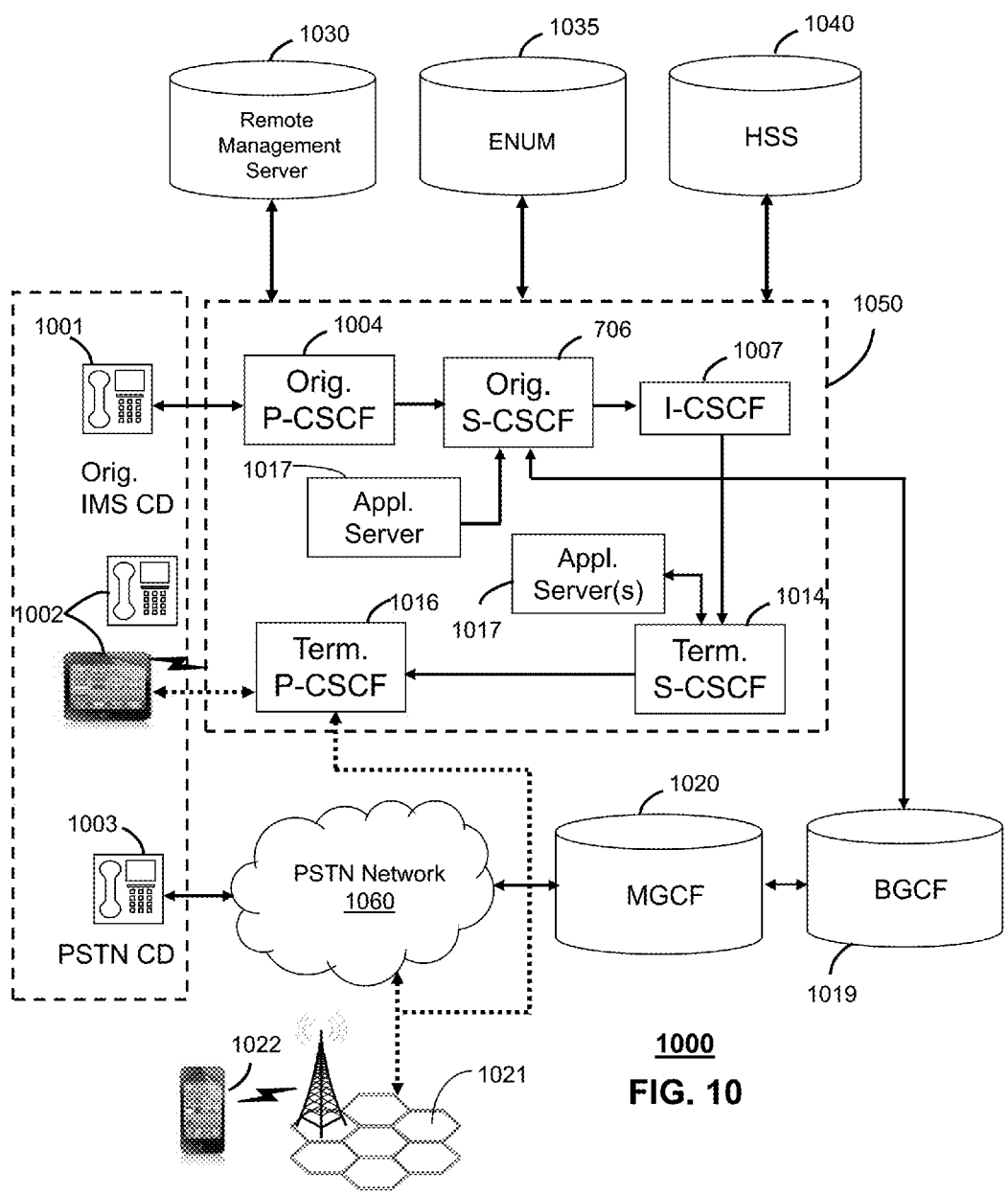
FIG. 10 depicts an illustrative embodiment of a communication system including telephone networks.

FIG. 10 depicts an illustrative embodiment of a communication system 1000 employing an IP Multimedia Subsystem (IMS) network architecture to facilitate the combined services of circuit-switched and packet-switched systems. Communication system 1000 can be overlaid or operably coupled with communication system 900 as another representative embodiment of communication system 1000. In particular, as shown in FIG. 10, a mobile device 1022 can communicate with network 1021 to obtain network information regarding the performance of the network, and in particular performance associated with network segments that are selected based on a trajectory (e.g., actual or predicted) of the mobile device 1022.

As an example, transmission requests can be managed (e.g., scheduling and/or rescheduling the requests) by the mobile device 1022 according to various factors, such as one or more of predicted power states of the mobile device 1022, network performance characteristics, historical network data, and so forth. The performance characteristics can be used for predicting future characteristics of the networks 1021, 1050, and 1060. The future characteristics can include future transport characteristics (e.g., predicted network traffic, predicted jitter, predicted available bandwidth, and so forth) and/or future segment characteristics (e.g., future availability of network elements of the network segments).

Once the mobile device 1022 determines which of the networks it will be utilizing, then data transmission requests can be sent via that selected network at a target time which can be determined from a predicted power state of the mobile device 1022, as well as performance characteristics associated with the network. As an example, the communication system 1000 can comprise a Home Subscriber Server (HSS) 1040, a management server 1030, a tElephone NUmber Mapping (ENUM) server 1035, and other network elements of an IMS network 1050. The IMS network 1050 can establish communications between IMS-compliant communication devices (CDs) 1001, 1002, Public Switched Telephone Network (PSTN) CDs 1003, and combinations thereof by way of a Media Gateway Control Function (MGCF) 1020 coupled to a PSTN network 1060. These established communications can be used for determining which networks are to be utilized and/or for sending out transmission requests for data packets. The MGCF 1020 need not be used when a communication session involves IMS CD to IMS CD communications. A communication session involving at least one PSTN CD may utilize the MGCF 1020.

IMS CDs 1001, 1002 can register with the IMS network 1050 by contacting a Proxy Call Session Control Function (P-CSCF) which communicates with an interrogating CSCF (I-CSCF), which in turn, communicates with a Serving CSCF (S-CSCF) to register the CDs with the HSS 1040. To initiate a communication session between CDs, an originating IMS CD 1001 can submit a Session Initiation Protocol (SIP INVITE) message to an originating P-CSCF 1004 which communicates with a corresponding originating S-CSCF 1006. The originating S-CSCF 1006 can submit the SIP INVITE message to one or more application servers (ASs) 1017 that can provide a variety of services to IMS subscribers.

For example, the application servers 1017 can be used to perform originating call feature treatment functions on the calling party number received by the originating S-CSCF 1006 in the SIP INVITE message. Originating treatment functions can include determining whether the calling party number has international calling services, call ID blocking, calling name blocking, 7-digit dialing, and/or is requesting special telephony features (e.g., *72 forward calls, *73 cancel call forwarding, *67 for caller ID blocking, and so on). Based on initial filter criteria (iFCs) in a subscriber profile associated with a CD, one or more application servers may be invoked to provide various call originating feature services. These application servers 1017 can also be used for providing performance characteristics associated with various network segments of the communication system 1000 so that the mobile device 1022 can schedule data transmission requests.

Additionally, the originating S-CSCF 1006 can submit queries to the ENUM system 1035 to translate an E.164 telephone number in the SIP INVITE message to a SIP Uniform Resource Identifier (URI) if the terminating communication device is IMS-compliant. The SIP URI can be used by an Interrogating CSCF (I-CSCF) 1007 to submit a query to the HSS 1040 to identify a terminating S-CSCF 1014 associated with a terminating IMS CD such as reference 1002. Once identified, the I-CSCF 1007 can submit the SIP INVITE message to the terminating S-CSCF 1014. The terminating S-CSCF 1014 can then identify a terminating P-CSCF 1016 associated with the terminating CD 1002. The P-CSCF 1016 may then signal the CD 1002 to establish Voice over Internet Protocol (VoIP) communication services, thereby enabling the calling and called parties to engage in voice and/or data communications. Based on the iFCs in the subscriber profile, one or more application servers may be invoked to provide various call terminating feature services, such as call forwarding, do not disturb, music tones, simultaneous ringing, sequential ringing, etc.

In some instances the aforementioned communication process is symmetrical. Accordingly, the terms "originating" and "terminating" in FIG. 10 may be interchangeable. It is further noted that communication system 1000 can be adapted to support video conferencing. In addition, communication system 1000 can be adapted to provide the IMS CDs 1001, 1002 with the multimedia and Internet services of communication system 900 of FIG. 9.

If the terminating communication device is instead a PSTN CD such as CD 1003 (in instances where the cellular phone only supports circuit-switched voice communications), the ENUM system 1035 can respond with an unsuccessful address resolution which can cause the originating S-CSCF 1006 to forward the call to the MGCF 1020 via a Breakout Gateway Control Function (BGCF) 1019. The MGCF 1020 can then initiate the call to the terminating PSTN CD over the PSTN network 1060 to enable the calling and called parties to engage in voice and/or data communications.

It is further appreciated that the CDs of FIG. 10 can operate as wireline or wireless devices. For example, the CDs of FIG. 10 can be communicatively coupled to a cellular base station 1021, a femtocell, a WiFi router, a Digital Enhanced Cordless Telecommunications (DECT) base unit, or another suitable wireless access unit to establish communications with the IMS network 1050 of FIG. 10. The cellular access base station 1021 can operate according to common wireless access protocols such as GSM, CDMA, TDMA, UMTS, WiMax, SDR, LTE, and so on. Other present and next generation wireless network technologies can be used by one or more embodiments of the subject disclosure. Accordingly, multiple wireline and wireless communication technologies can be used by the CDs of FIG. 10.

Cellular phones supporting LTE can support packet-switched voice and packet-switched data communications and thus may operate as IMS-compliant mobile devices 1022. In this embodiment, the cellular base station 1021 may communicate directly with the IMS network 1050 as shown by the arrow connecting the cellular base station 1021 and the P-CSCF 1016. In particular, the cellular phone (mobile device) can schedule a time for sending a request for transmission over the network of a data packet, in accordance with one or more of a predicted future power state of the mobile device, a predicted future transport characteristic, or a predicted future segment characteristic. The efficient scheduling of requests for transmission of data packet(s) associated with media content can avoid or reduce a degradation in viewing quality of the media content displayed by the mobile device, such as enabling the data packets to be timely received, enabling the data packets to be received with lower errors, and so forth, which may otherwise cause the degradation of viewing quality.

Alternative forms of a CSCF can operate in a device, system, component, or other form of centralized or distributed hardware and/or software. Indeed, a respective CSCF may be embodied as a respective CSCF system having one or more computers or servers, either centralized or distributed, where each computer or server may be configured to perform or provide, in whole or in part, any method, step, or functionality described herein in accordance with a respective CSCF. Likewise, other functions, servers and computers described herein, including but not limited to, the HSS, the ENUM server, the BGCF, and the MGCF, can be embodied in a respective system having one or more computers or servers, either centralized or distributed, where each computer or server may be configured to perform or provide, in whole or in part, any method, step, or functionality described herein in accordance with a respective function, server, or computer.

The network map server of FIG. 9 can be operably coupled to the second communication system 1000 for purposes similar to those described above. The network map server can be an integral part of the application server(s) 1017, which can be adapted to the operations of the IMS network 1050.

For illustration purposes only, the terms S-CSCF, P-CSCF, I-CSCF, and so on, can be server devices, but may be referred to in the subject disclosure without the word "server." It is also understood that any form of a CSCF server can operate in a device, system, component, or other form of centralized or distributed hardware and software. It is further noted that these terms and other terms such as DIAMETER commands are terms can include features, methodologies, and/or fields that may be described in whole or in part by standards bodies such as $3^{rd}$ Generation Partnership Project (3GPP). It is further noted that some or all embodiments of the subject disclosure may in whole or in part modify, supplement, or otherwise supersede final or proposed standards published and promulgated by 3GPP.

Figure 11:
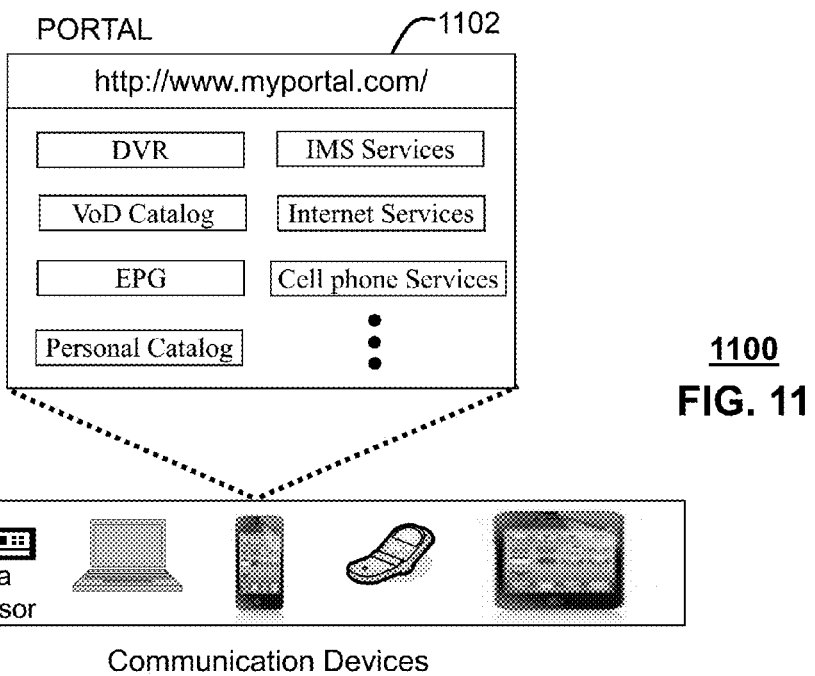
FIG. 11 depicts an illustrative embodiment of a web portal for interacting with one or more communication devices of the communication system of FIG. 10.

FIG. 11 depicts an illustrative embodiment of a communication system 1100 including a web portal 1102 which can be hosted by server applications operating from the computing devices 930 of the communication system 900 illustrated in FIG. 9. Communication system 1100 can be overlaid or operably coupled with communication system 900 as another representative embodiment of the disclosure. The communication devices shown in FIG. 11 are examples of devices that can communicate with networks as shown in FIG. 1. In an embodiment, a mobile device as shown in FIG. 11 can establish a connection with a content source via the web portal 1102 for delivery of media segments. A time can be scheduled, by the mobile device, for sending a request for transmission over a network of a data packet, in accordance with one or more of a predicted future power state of the mobile device, a predicted future transport characteristic, or a predicted future segment characteristic. The content source made accessible by the web portal 1102 Is not limited to service provider sources, and can also include customer equipment, such as a Digital Video Recorder (DVR).

The web portal 1102 can be used for managing services of communication systems 900-1000. A web page of the web portal 1102 can be accessed by a Uniform Resource Locator (URL) with an Internet browser using an Internet-capable communication device such as those described in FIGS. 1-2. The web portal 1102 can be configured, for example, to access a media processor 106 and services managed thereby such as a DVR, a Video on Demand (VoD) catalog, an Electronic Programming Guide (EPG), or a personal catalog (such as personal videos, pictures, audio recordings, etc.) stored at a media processor (e.g., media processor 906 of FIG. 9). The web portal 1102 can also be used for provisioning IMS services described earlier, provisioning Internet services, provisioning cellular phone services, and so on.

Figure 12:
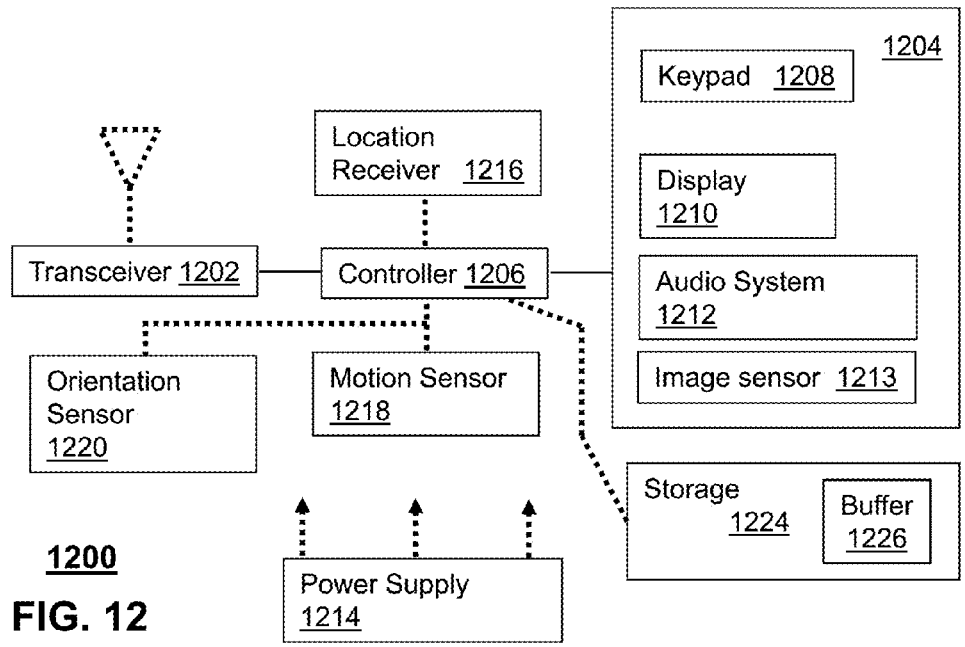
FIG. 12 depicts an illustrative embodiment of a communication device.

FIG. 12 depicts an illustrative embodiment of a communication device 1200. Communication device 1200 can serve in whole or in part as an illustrative embodiment of the mobile devices depicted in FIGS. 1-3 and FIGS. 9-10. Communication device 1200 can include a computer-readable storage device 1224 with executable instructions which, when executed by a controller 1206, cause the controller 1206 to perform operations. The operations can include the controller 1206 obtaining performance characteristics for network segments of a network. The network segments can be selected, such as by the controller 1206 (although the selection can be made by another device such as a network server), from a group of network segments of the network based on a trajectory (e.g., actual or predicted) of the communication device 1200. The controller 1206 can monitor power state transitions of the mobile device. The controller 1206 can predict a future power state of the mobile device based on the monitoring of the power state transitions. The future power state prediction can be based on other factors such as determining a first elapsed time from sending a first request for transmission or a second elapsed time from receiving a first data packet. The controller 1206 can determine a target time for sending a second request for transmission of a second data packet over the network. The target time can be determined based on the performance characteristics for the network segments and/or based on the predicted future power state of the mobile device. The controller 1206 can schedule a time for sending the second request for transmission according to the target time. The selected time for sending the second transmission request can enable the data packet to be received at a desired time which facilitates the use of the data packet, such as where the data packet is a media segment and where the media content is being presented at the communication device 1200. The storage device 1224 can include a buffer 1226 for the data packets.

To enable these features, communication device 1200 can comprise a wireline and/or wireless transceiver 1202 (herein transceiver 1202), a user interface (UI) 1204, a power supply 1214, a location receiver 1216, a motion sensor 1218, an orientation sensor 1220, and a controller 1206 for managing operations thereof. The transceiver 1202 can support short-range or long-range wireless access technologies such as Bluetooth®, ZigBee®, WiFi, DECT, or cellular communication technologies, just to mention a few. Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 1202 can also be adapted to support circuit-switched wireline access technologies (such as PSTN), packet-switched wireline access technologies (such as TCP/IP, VoIP, etc.), and combinations thereof.

The UI 1204 can include a depressible or touch-sensitive keypad 1208 with a navigation mechanism such as a roller ball, a joystick, a mouse, or a navigation disk for manipulating operations of the communication device 1200. The keypad 1208 can be an integral part of a housing assembly of the communication device 1200 or an independent device operably coupled thereto by a tethered wireline interface (such as a USB cable) or a wireless interface supporting for example Bluetooth®. The keypad 1208 can represent a numeric keypad commonly used by phones, and/or a QWERTY keypad with alphanumeric keys. The UI 1204 can further include a display 1210 such as monochrome or color LCD (Liquid Crystal Display), OLED (Organic Light Emitting Diode) or other suitable display technology for conveying images to an end user of the communication device 1200. In an embodiment where the display 1210 is touch-sensitive, a portion or all of the keypad 1208 can be presented by way of the display 1210 with navigation features.

The display 1210 can use touch screen technology to also serve as a user interface for detecting user input. As a touch screen display, the communication device 1200 can be adapted to present a user interface with graphical user interface (GUI) elements that can be selected by a user with a touch of a finger. The touch screen display 1210 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 1210 can be an integral part of the housing assembly of the communication device 1200 or an independent device communicatively coupled thereto by a tethered wireline interface (such as a cable) or a wireless interface.

The UI 1204 can also include an audio system 1212 that utilizes audio technology for conveying low volume audio (such as audio heard in proximity of a human ear) and high volume audio (such as speakerphone for hands free operation). The audio system 1212 can further include a microphone for receiving audible signals of an end user. The audio system 1212 can also be used for voice recognition applications. The UI 1204 can further include an image sensor 1213 such as a charged coupled device (CCD) camera for capturing still or moving images.

The power supply 1214 can utilize common power management technologies such as replaceable and rechargeable batteries, supply regulation technologies, and/or charging system technologies for supplying energy to the components of the communication device 1200 to facilitate long-range or short-range portable applications. Alternatively, or in combination, the charging system can utilize external power sources such as DC power supplied over a physical interface such as a USB port or other suitable tethering technologies.

The location receiver 1216 can utilize location technology such as a global positioning system (GPS) receiver capable of assisted GPS for identifying a location of the communication device 1200 based on signals generated by a constellation of GPS satellites, which can be used for facilitating location services such as navigation. The motion sensor 1218 can utilize motion sensing technology such as an accelerometer, a gyroscope, or other suitable motion sensing technology to detect motion of the communication device 1200 in three-dimensional space. The orientation sensor 1220 can utilize orientation sensing technology such as a magnetometer to detect the orientation of the communication device 1200 (north, south, west, and east, as well as combined orientations in degrees, minutes, or other suitable orientation metrics).

The communication device 1200 can use the transceiver 1202 to also determine a proximity to a cellular, WiFi, Bluetooth®, Zigbee® or other wireless access points by sensing techniques such as utilizing a received signal strength indicator (RSSI) and/or signal time of arrival (TOA) or time of flight (TOF) measurements. The controller 1206 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 1200.

Other components not shown in FIG. 12 can be used in one or more embodiments of the subject disclosure. For instance, the communication device 1200 can include a reset button (not shown). The reset button can be used to reset the controller 1206 of the communication device 1200. In yet another embodiment, the communication device 1200 can also include a factory default setting button positioned, for example, below a small hole in a housing assembly of the communication device 1200 to force the communication device 1200 to re-establish factory settings. In this embodiment, a user can use a protruding object such as a pen or paper clip tip to reach into the hole and depress the default setting button. The communication device 1200 can also include a slot for adding or removing an identity module such as a Subscriber Identity Module (SIM) card. SIM cards can be used for identifying subscriber services, executing programs, storing subscriber data, and so forth.

The communication device 1200 as described herein can operate with more or fewer of the circuit components shown in FIG. 12. These variant embodiments can be used in one or more embodiments of the subject disclosure.

The communication device 1200 can be adapted to perform the functions of the media processor 906, the media devices 908, or the mobile devices 916 of FIG. 9, as well as the IMS CDs 1001-1002 and PSTN CDs 1003 of FIG. 10. It will be appreciated that the communication device 1200 can also represent other devices that can operate in communication systems 900-1000 of FIGS. 9-10 such as a gaming console and a media player.

The communication device 1200 shown in FIG. 12 or portions thereof can serve as a representation of one or more of the devices of FIGS. 1-3, communication system 900, and communication system 1000.

Upon reviewing the aforementioned embodiments, it would be evident to an artisan with ordinary skill in the art that said embodiments can be modified, reduced, or enhanced without departing from the scope of the claims described below. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

Figure 13:
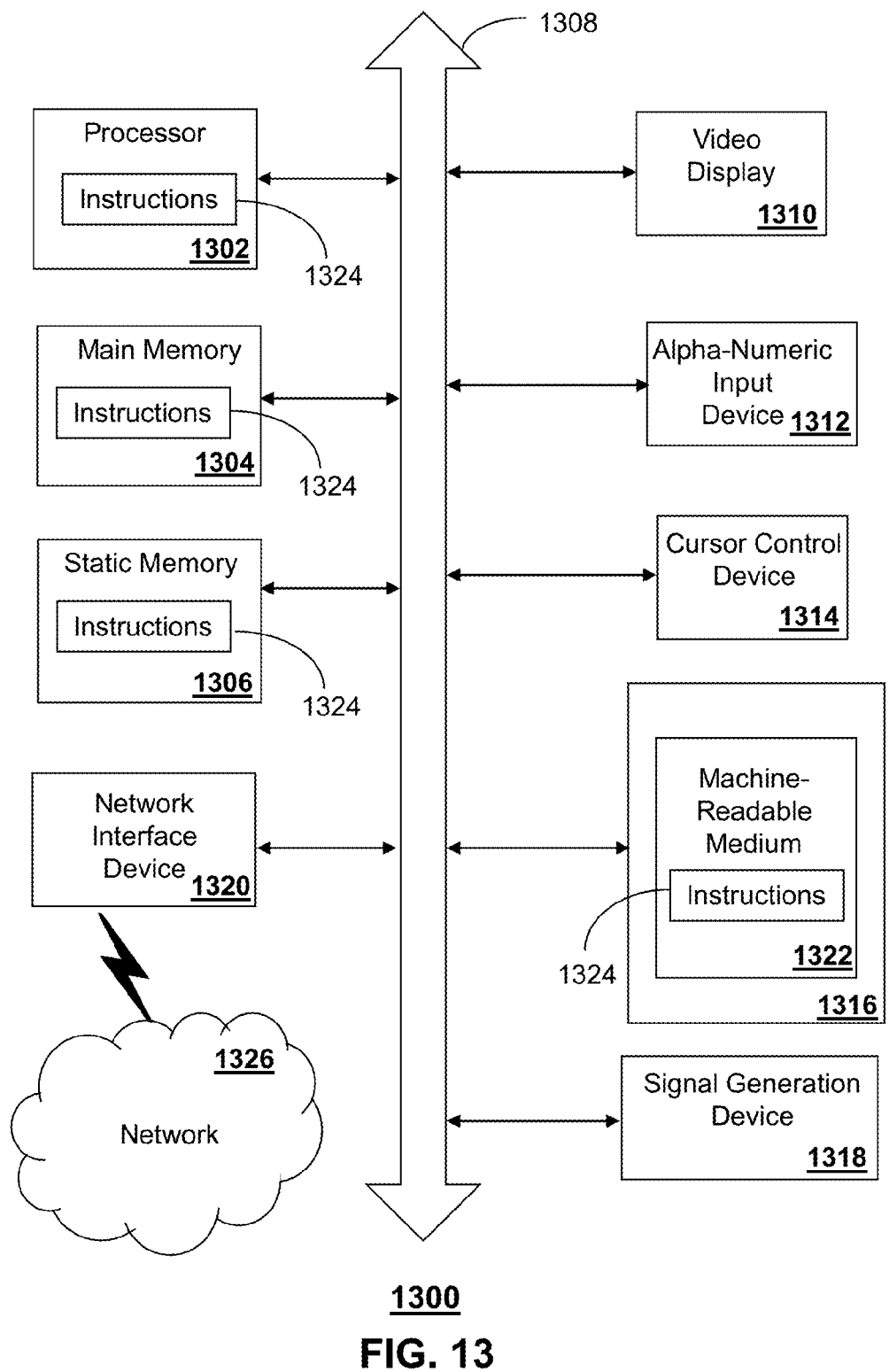
FIG. 13 is a diagrammatic representation of a machine in the form of a computer system within which a set of instructions, when executed, may cause the machine to perform any one or more of the methods described herein.

FIG. 13 depicts an exemplary diagrammatic representation of a machine in the form of a computer system 1300 within which a set of instructions, when executed, may cause the machine to perform any one or more of the methods described above. For example, one or more instances of the machine can enable a target time to be determine for sending a request for transmission of a data packet over the network, where the target time is determined based on performance characteristics for network segments (e.g., selected based on a mobile device trajectory) and/or based on the future power state of the mobile device.

One or more instances of the machine can operate, for example, as the network map server, the mobile device, and other devices of FIGS. 1-3. In some embodiments, the machine may be connected (e.g., using a network 1326) to other machines. In a networked deployment, the machine may operate in the capacity of a server or a client user machine in server-client user network environment, or as a peer machine in a peer-to-peer (or distributed) network environment.

The machine may comprise a server computer, a client user computer, a personal computer (PC), a tablet PC, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 1300 may include a processor (or controller) 1302 (e.g., a central processing unit (CPU), a graphics processing unit (GPU, or both), a main memory 1304 and a static memory 1306, which communicate with each other via a bus 1308. The computer system 1300 may further include a display unit 1310 (e.g., a liquid crystal display (LCD), a flat panel, or a solid state display. The computer system 1300 may include an input device 1312 (e.g., a keyboard), a cursor control device 1314 (e.g., a mouse), a disk drive unit 1316, a signal generation device 1318 (e.g., a speaker or remote control) and a network interface device 1320. In distributed environments, the embodiments described in the subject disclosure can be adapted to utilize multiple display units 1310 controlled by two or more computer systems 1300. In this configuration, presentations described by the subject disclosure may in part be shown in a first of the display units 1310, while the remaining portion is presented in a second of the display units 1310.

The disk drive unit 1316 may include a tangible computer-readable storage medium 1322 on which is stored one or more sets of instructions (e.g., software 1324) embodying any one or more of the methods or functions described herein, including those methods illustrated above. The instructions 1324 may also reside, completely or at least partially, within the main memory 1304, the static memory 1306, and/or within the processor 1302 during execution thereof by the computer system 1300. The main memory 1304 and the processor 1302 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 1322 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 1300.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, can be used in the subject disclosure. In one or more embodiments, features that are positively recited can also be excluded from the embodiment with or without replacement by another component or step. The steps or functions described with respect to the exemplary processes or methods can be performed in any order. The steps or functions described with respect to the exemplary processes or methods can be performed alone or in combination with other steps or functions (from other embodiments or from other steps that have not been described).

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A mobile device comprising:
   a processing system including a processor; and
   a memory that stores executable instructions that, when executed by the processing system, facilitate performance of operations comprising:
      obtaining performance characteristics for network segments of a network, the mobile device communicatively coupled to the network, the network segments selected from a group of network segments of the network based on a trajectory of the mobile device;

predicting a future transport characteristic and a future segment characteristic for the network segments based on the performance characteristics, the future segment characteristic being associated with a selected network segment of the group of network segments;

predicting a future transport characteristic and a future segment characteristic for the network segments based on the performance characteristics, the future segment characteristic being associated with a selected network segment of the group of network segments;

predicting a future power state of the mobile device based on monitoring a power state of the mobile device and requests for data transmission over the network, wherein the mobile device, upon performing a first power state transition from a low-power state to a high-power state responsive to sending a request for data transmission, is predicted to perform a second power state transition from the high-power state to the low-power state after a predetermined elapsed time;

determining a target time for sending a request for transmission of a data packet over the network, the target time being determined based on the future power state of the mobile device, the future transport characteristic and the future segment characteristic; and scheduling a time for sending the request for transmission of the data packet according to the target time, wherein the sending of the request for transmission of the data packet is performed only while the mobile device is in the high-power state; and wherein, responsive to the power state and the future power state both being the low-power state, the sending of the request for transmission of the data packet initiates a power state transition from the low-power state to the high-power state, thereby facilitating the sending of the request for transmission of the data packet.

2. The mobile device of claim 1, wherein the future transport characteristic comprises a predicted network traffic delay and a predicted available bandwidth, wherein the future segment characteristic comprises future availability of network elements of the network segments, and wherein the operations further comprise receiving and buffering the data packet for presentation of media content.

3. The mobile device of claim 2, wherein the target time is determined based on reducing a degradation in a viewing quality of media content to be displayed by the mobile device, wherein the trajectory of the mobile device is on a path having network elements that provide varying transmission rates to the mobile device, wherein the power state comprises a power off state, the high-power state or the low-power state, and wherein the operations further comprise:

determining an anticipated power state corresponding to the target time;

responsive to the anticipated power state not being the high-power state, determining a reschedule time corresponding to when the mobile device is predicted to be in the high-power state; and rescheduling the time for sending the request for transmission according to the reschedule time.

4. The mobile device of claim 3, wherein the determining of the anticipated power state comprises monitoring power state transitions of the mobile device and predicting a transition between the high-power state and the low-power state, wherein the transition between the high-power state and the low-power state is predicted based on a first elapsed time from sending another transmission request or a second elapsed time from receiving a second data packet.

5. The mobile device of claim 1, wherein the predicting of the future power state comprises monitoring an elapsed time from sending a second request for transmission of a second data packet, wherein the second request is initiated by an application being executed by the processing system, and wherein the application is not associated with the request for transmission of the data packet.

6. The mobile device of claim 1, wherein the predicting of the future power state comprises monitoring an elapsed time from receiving a second data packet, wherein the second data packet is associated with an application being executed by the processing system, and wherein the application is not associated with the request for transmission of the data packet.

7. The mobile device of claim 1, wherein the performance characteristics for the network segments comprise historical performance data, wherein the network comprises first and second networks, wherein the mobile device is communicatively coupled with the first network and subsequently with the second network in accordance with availability of the second network, the second network being intermittently available, and wherein the operations further comprise predicting availability of the second network.

8. The mobile device of claim 1, wherein the performance characteristics comprise historical performance data indexed by a time of day, and wherein the operations further comprise:

obtaining location information and movement information for the mobile device using a location receiver and a motion sensor of the mobile device;

determining the trajectory of the mobile device based on the location information and the movement information; and wherein the obtaining of the performance characteristics for the network segments comprises obtaining transport characteristics of the network via a network map server remote from the mobile device.

9. The mobile device of claim 8, wherein the transport characteristics comprise network traffic and jitter, and wherein the future segment characteristic comprises an availability for each of the group of network segments.

10. A method comprising:

obtaining, by a processing system including a processor of a mobile device, performance characteristics for network segments of a network, the mobile device communicatively coupled to the network, the network segments selected from a group of network segments of the network based on a trajectory of the mobile device;

monitoring, by the processing system, power state transitions of the mobile device;

predicting, by the processing system, a future power state of the mobile device based on the monitoring of the power state transitions and based on determining a first elapsed time from sending a first request for transmission or a second elapsed time from receiving a first data packet, wherein the mobile device, upon performing a first power state transition from a low-power state to a high-power state responsive to sending the first request or receiving the first data packet, is predicted to perform a second power state transition from the high-power state to the low-power state after the first elapsed time or the second elapsed time respectively;

determining, by the processing system, a target time for sending a second request for transmission of a second data packet over the network, the target time being determined based on the performance characteristics for the network segments and based on the future power state of the mobile device; and scheduling, by the processing system, a time for sending the second request for transmission according to the target time, wherein the sending of the second request is performed only while the mobile device is in a high-power state; and wherein, responsive to a present power state and the future power state both being a low-power state, the sending of the second request initiates a power state transition in the mobile device from the low-power state to the high-power state, thereby facilitating the sending of the second request.

11. The method of claim 10, further comprising:

receiving and buffering, by the processing system, the second data packet for presentation of media content associated with the second data packet; and determining, by the processing system, the trajectory of the mobile device based on historical location data associated with the mobile device.

12. The method of claim 10, wherein the performance characteristics comprise other transmission requests from other mobile devices and a future availability of network elements of the network segments.

13. The method of claim 10, further comprising:

determining, by the processing system, an anticipated power state corresponding to the time for sending the second request; and responsive to the anticipated power state not being the high-power state, rescheduling, by the processing system, the sending of the second request to a rescheduled time when the mobile device is predicted to be in the high-power state.

14. The method of claim 10, wherein the first request for transmission is associated with a first application being executed by the mobile device, and wherein the second request for transmission is associated with a second application being executed by the mobile device.

15. The method of claim 10, wherein the first data packet is associated with a first application being executed by the mobile device, and wherein the second data packet is associated with a second application being executed by the mobile device.

16. A machine-readable storage device comprising executable instructions which, responsive to being executed by a processing system including a processor of a mobile device, facilitate performance of operations comprising:

obtaining performance characteristics for network segments of a network, the network segments selected from a group of network segments of the network based on a trajectory of the mobile device;

monitoring power state transitions of the mobile device;

predicting a future power state of the mobile device based on the monitoring of the power state transitions and requests for data transmission over the network, wherein the mobile device, upon performing a first power state transition from a low-power state to a high-power state responsive to sending a request for data transmission, is predicted to perform a second power state transition from the high-power state to the low-power state after a predetermined elapsed time;

determining a target time for sending a request for transmission of a data packet over the network, the target time being determined based on the performance characteristics for the network segments and based on the future power state of the mobile device; and scheduling a time for sending the request for transmission of the data packet according to the target time, wherein the sending of the request for transmission of the data packet is performed only while the mobile device is in a high-power state; and wherein, responsive to the power state and the future power state both being the low-power state, the sending of the request initiates a power state transition from the low-power state to the high-power state, thereby facilitating the sending of the request for transmission of the data packet.

17. The machine-readable storage device of claim 16, wherein the operations further comprise:

determining an anticipated power state corresponding to the target time; and responsive to the anticipated power state not being the high-power state, rescheduling the sending of the request to a rescheduled time at which the mobile device is predicted to be in the high-power state.

18. The machine-readable storage device of claim 16, wherein the predicting of the future power state of the mobile device is based on determining a first elapsed time from sending a second request for transmission or a second elapsed time from receiving a second data packet.

19. The machine-readable storage device of claim 18, wherein the request for transmission is associated with a first application being executed by the mobile device, and wherein the second request for transmission is associated with a second application being executed by the mobile device.

20. The machine-readable storage device of claim 18, wherein the operations further comprise receiving the data packet for presentation of media content associated with the data packet, wherein the receiving of the data packet is associated with a first application being executed by the mobile device, and wherein the receiving of the second data packet is associated with a second application being executed by the mobile device.

* * * * *